United States Patent
Kotaka et al.

(10) Patent No.: US 12,280,584 B2
(45) Date of Patent: Apr. 22, 2025

(54) MULTILAYER STRUCTURE, METHOD OF PRODUCING THE SAME, AND PACKAGING CONTAINER

(71) Applicant: PLANTIC TECHNOLOGIES LTD, Altona (AU)

(72) Inventors: Akihiro Kotaka, Kurashiki (JP); Masahiko Ota, Kurashiki (JP); Nicholas John McCaffrey, Altona (AU)

(73) Assignee: PLANTIC TECHNOLOGIES LTD, Altona (AU)

( * ) Notice: Subject to any disclaimer, the term of this patent is extended or adjusted under 35 U.S.C. 154(b) by 500 days.

(21) Appl. No.: 17/641,990

(22) PCT Filed: Sep. 11, 2020

(86) PCT No.: PCT/IB2020/058441
§ 371 (c)(1),
(2) Date: Mar. 10, 2022

(87) PCT Pub. No.: WO2021/048795
PCT Pub. Date: Mar. 18, 2021

(65) Prior Publication Data
US 2023/0241864 A1   Aug. 3, 2023

(30) Foreign Application Priority Data
Sep. 13, 2019   (JP) .................................. 2019-167518

(51) Int. Cl.
B32B 9/02     (2006.01)
B32B 7/12     (2006.01)
B32B 27/36    (2006.01)

(52) U.S. Cl.
CPC ................. *B32B 9/02* (2013.01); *B32B 7/12* (2013.01); *B32B 27/36* (2013.01);
(Continued)

(58) Field of Classification Search
None
See application file for complete search history.

(56) References Cited

U.S. PATENT DOCUMENTS 7,749,591 B2    7/2010  Fukunaga et al.
2007/0292665 A1  12/2007 Fukunaga et al.
(Continued)

FOREIGN PATENT DOCUMENTS

EP    3 366 470 A1    8/2018
JP    7-265192 A     10/1995
(Continued)

OTHER PUBLICATIONS

Extended European Search Report issued on Oct. 5, 2023 in European Patent Application No. 20863709.0, 8 pages.
(Continued)

*Primary Examiner* — Jeffrey D Washville
(74) *Attorney, Agent, or Firm* — Oblon, McClelland, Maier & Neustadt, L.L.P.

(57) ABSTRACT

The present invention relates to a multilayer structure including a starch layer (A), an adhesive layer (B), and a base material layer (C) in the order mentioned. In this multilayer structure, a material constituting the starch layer (A) comprises a starch and water; a material constituting the adhesive layer (B) comprises a thermoplastic resin having a density of 0.920 $g/cm^3$ or lower and has an acid value of 0.3 mgKOH/g or higher; and the base material layer (C) is a layer having a tensile elastic modulus of 100 MPa or higher.

9 Claims, 1 Drawing Sheet

(52) U.S. Cl.
   CPC ... *B32B 2250/02* (2013.01); *B32B 2307/7163* (2013.01); *B32B 2307/7244* (2013.01); *B32B 2317/20* (2013.01); *B32B 2367/00* (2013.01); *B32B 2439/70* (2013.01)

(56) References Cited

U.S. PATENT DOCUMENTS

| | | | |
|---|---|---|---|
| 2014/0349047 | A1 | 11/2014 | McCaffrey et al. |
| 2015/0210461 | A1 | 7/2015 | Morris et al. |
| 2019/0176455 | A1 | 6/2019 | Kikuchi et al. |

FOREIGN PATENT DOCUMENTS

| | | |
|---|---|---|
| JP | 2009-91020 A | 4/2009 |
| JP | 2010-529220 A | 8/2010 |
| JP | 2015-508341 A | 3/2015 |
| JP | 2015-533733 A | 11/2015 |
| JP | 2019-85169 A | 6/2019 |
| WO | WO 2013/090973 A1 | 6/2013 |
| WO | WO 2015/042641 A1 | 4/2015 |

OTHER PUBLICATIONS

International Search Report issued Jan. 21, 2021 in PCT/IB2020/058441 filed on Sep. 11, 2020, 5 pages.

International Preliminary Report on Patentability & Written Opinion issued Mar. 15, 2022 in PCT/IB2020/058441 filed on Sep. 11, 2020, 5 pages.

Dole et al., "Evaluation of Starch-PE Multilayers: Processing and Properties", Polymer Engineering and Science, 2005, pp. 217-224.

Yoo et al., "Interfacial Adhesion Reaction of Polyethylene and Starch Blends Using Maleated Polyethylene Reactive Compatibilizer", Journal of Applied Polymer Science, 2001, vol. 83, pp. 767-776.

Glenn et al., "Starch Plastic Packaging and Agriculture Applications", Publications from USDA-ARS, 2014, UNL Faculty. Paper 1459., pp. 421-452.

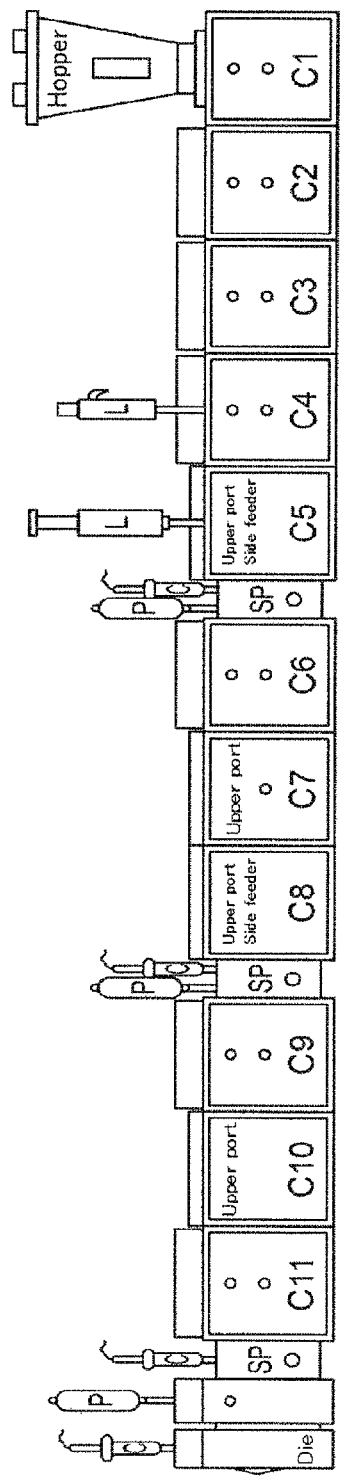

MULTILAYER STRUCTURE, METHOD OF PRODUCING THE SAME, AND PACKAGING CONTAINER

TECHNICAL FIELD

The present invention relates to a multilayer structure, a method of producing the same, and a packaging container comprising the multilayer structure.

BACKGROUND ART

Resin layers comprising a starch as a main component are biodegradable and have excellent gas barrier properties; therefore, they are widely used in food packaging containers.

Since such resin layers comprising a starch as a main component are highly hydrophilic and their barrier properties are likely to be markedly deteriorated by the effect of humidity, these resin layers need to be multi-layered with a water-resistant material particularly when barrier properties are required (Patent Documents 1 and 2). As a method for the multi-layering, an extrusion coating method using an outer layer material is often employed from the productivity standpoint. As the outer layer material, for example, PET, PE, PP, nylon, polyvinyl chloride, or polyvinylidene chloride is used.

PRIOR ART DOCUMENTS

Patent Documents

[Patent Document 1] JP 2015-508341 A
[Patent Document 2] JP 2015-533733 A

SUMMARY OF THE INVENTION

Problems to be Solved by the Invention

With regard to the production of a multilayer structure that includes a starch resin layer, it is described in the prior art that a starch resin and an adhesive resin can be used in an extrusion coating method. However, a starch resin layer absorbs/desorbs moisture and thereby expands/contracts by at least several % due to the effects of external temperature and humidity. Accordingly, such a starch resin layer has a problem in that its peel strength is markedly reduced because of the different from an adhesive resin layer in terms of the degree of the shrinkage, particularly when stored under a low-humidity condition.

In view of the above, an object of the present invention is to provide: a multilayer structure comprising a starch resin layer, which maintains a peel strength even when stored under a low-humidity condition; a method of producing the same; and a packaging container comprising the multilayer structure.

Means for Solving Problems

As a result of the diligent stidues, the present inventors found that the above-described problems can be solved, thereby completing the present invention. That is, the present invention encompasses the following preferred embodiments.

[1] A multilayer structure comprising, in the following order:
  a starch layer (A);
  an adhesive layer (B); and
  a base material layer (C),
wherein
  a material constituting the starch layer (A) comprises a starch and water,
  a material constituting the adhesive layer (B) comprises a thermoplastic resin having a density of 0.920 g/cm$^3$ or lower, and
  the base material layer (C) is a layer having a tensile elastic modulus of 100 MPa or higher.

[2] The multilayer structure according to [1], wherein the content of the starch in the material constituting the starch layer (A) is 20% by mass or more, and the content of amylose in the starch is 50% by mass or more.

[3] The multilayer structure according to [1] or [2], wherein the material constituting the starch layer (A) comprises at least one water-soluble polymer.

[4] The multilayer structure according to any one of [1] to [3], wherein the material constituting the starch layer (A) comprises at least one clay.

[5] The multilayer structure according to any one of [1] to [4], wherein the material constituting the adhesive layer (B) has an acid value of 0.3 mgKOH/g or higher.

[6] The multilayer structure according to any one of [1] to [5], wherein the material constituting the adhesive layer (B) comprises a polyolefin-based polymer.

[7] The multilayer structure according to any one of [1] to [6], wherein a material constituting the base material layer (C) comprises at least one selected from the group consisting of polyethylene terephthalates, polylactic acids, polyethylenes, polypropylenes, cellophanes, aromatic polyesters, and polybutylene succinates.

[8] A method of producing the multilayer structure according to any one of [1] to [7], the method comprising the steps of:
  co-extruding an adhesive layer (B) and a base material layer (C); and
  subsequently coating a side of the adhesive layer (B) onto a starch layer (A).

[9] A method of producing the multilayer structure according to any one of [1] to [7], the method comprising the steps of:
  extruding an adhesive layer (B); and
  subsequently coating the adhesive layer (B) between a starch layer (A) and a base material layer (C).

[10] A packaging container, comprising the multilayer structure according to any one of [1] to [7].

Effects of the Invention

According to the multilayer structure of the present invention, a multilayer structure comprising a starch resin layer, which maintains a peel strength even when stored under a low-humidity condition, can be provided.

BRIEF DESCRIPTION OF THE DRAWING

FIG. 1 is a schematic drawing that illustrates a twin screw extruder used in the preparation of a starch layer (A) in Examples.

EMBODIMENTS OF THE INVENTION

The multilayer structure of the present invention comprises a starch layer (A), an adhesive layer (B), and a base material layer (C) in the order mentioned. A material constituting the starch layer (A) comprises a starch and water, and a material constituting the adhesive layer (B) comprises a thermoplastic resin having a density of 0.920 g/cm$^3$ or lower. The material constituting the adhesive layer (B) has an acid value of 0.3 mgKOH/g or higher, and the base material layer (C) is a layer having a tensile elastic modulus of 100 MPa or higher.

<Starch Layer (A)>

The material constituting the starch layer (A) comprises a starch (A1) and water. In the starch layer (A), it is preferred that the content of the starch (A1) be 20% by mass or more, and the content of amylose in the starch (A1) be 50% by mass or more. Further, in the material constituting the starch layer (A), the content of the starch (A1) is preferably 50 to 98% by mass, more preferably 70 to 98% by mass. When the content of the starch (A1) is in this range, good gas barrier properties tend to be obtained.

[Starch (A1)]

Examples of the starch (A1) include starches derived from cassava, corn, potato, sweet potato, sago, tapioca, sorghum, bean, bracken fern, lotus, water caltrop, wheat, rice, oat, arrowroot, pea, and the like.

The starch (A1) may be a modified starch. From the standpoint of the amylose content, a starch used as a raw material of the modified starch is preferably a starch derived from corn (maize) or cassava, more preferably a starch derived from corn. The modified starch may be, for example, an etherified starch, an esterified starch, a cationized starch, or a crosslinked starch. The material constituting the starch layer (A) may comprise any one of, or two or more of these modified starches.

Examples of the etherified starch include: alkyl etherified starches, such as methyl etherified starch; carboxyalkyl etherified starches, such as carboxymethyl etherified starch; and hydroxyalkyl etherified starches, such as etherified starches comprising a hydroxyalkyl group having 2 to 6 carbon atoms. Further, allyl etherified starches and the like can be used as well.

Examples of the esterified starch include: esterified starches having a carboxylic acid-derived structural unit, such as those having an acetic acid-derived structural unit; esterified starches having a dicarboxylic anhydride-derived structural unit, such as those having a maleic anhydride-derived structural unit, those having a phthalic anhydride-derived structural unit, and those having an octenylsuccinic anhydride-derived structural unit; and esterified starches having an oxoacid-derived structural unit, such as nitric acid-esterified starch, phosphoric acid-esterified starch, and urea phosphate-esterified starch. Other examples include xanthic acid-esterified starch and acetoacetic acid-esterified starch.

Examples of the cationized starch include reaction products of a starch and 2-diethylaminoethyl chloride, and reaction products of a starch and 2,3-epoxypropyltrimethylammonium chloride.

Examples of the crosslinked starch include formaldehyde-crosslinked starches, epichlorohydrin-crosslinked starches, phosphoric acid-crosslinked starches, and acrolein-crosslinked starches.

Among the above-exemplified modified starches, from the standpoint of inhibiting a reduction in the peel strength under a low-humidity condition, an etherified starch comprising a hydroxyalkyl group having 2 to 6 carbon atoms, an esterified starch having a dicarboxylic anhydride-derived structural unit, or a combination thereof is preferred, and a hydroxyethyl etherified starch, a hydroxypropyl etherified starch, a hydroxybutyl etherified starch, an esterified starch having a maleic anhydride-derived structural unit, an esterified starch having a phthalic anhydride-derived structural unit, an esterified starch having an octenylsuccinic anhydride-derived, or a combination thereof is more preferred.

The etherified starch comprising a hydroxyalkyl group having 2 to 6 carbon atoms may be obtained by a reaction between an alkylene oxide and a starch. Examples of the alkylene oxide include ethylene oxide, propylene oxide, and butylene oxide. The average number of hydroxy groups used for modification is preferably 0.05 to 2 per glucose unit in the starch.

The modified starch may be produced by modifying a starch having a prescribed amylose content by a method known in the art, or a commercially available modified starch may be used. Examples of a representative commercial product of the modified starch include ECOFILM (registered trademark) and NATIONAL 7 (registered trademark), which are hydroxypropyl etherified starches available from Ingredion Incorporated.

In the starch (A1) contained in the starch layer (A), the amylose content is preferably 50% by mass or more, more preferably 55% by mass or more, still more preferably 60% by mass or more. When the amylose content in the starch (A1) is 50% by mass or more, an increase in the viscosity is controlled, so that a good sheet moldability is likely to be obtained. Further, the amylose content in the starch (A1) is usually 90% by mass or less. The amylose content in the starch (A1) can be determined by, for example, the iodine colorimetric method described in "Starch 50 No. 4, 158-163 (1998)". When the starch layer (A) comprises two or more starches (A1), the amylose content of the starches (A1) means an average amylose content, which is a weighted average value that takes into account the composition ratio of the two or more starches.

The starch (A1) has a water content of preferably 2 to 15% by mass. The water content can be determined by, for example, using a halogen moisture meter.

[Water]

The material constituting the starch layer (A) comprises water. In the starch layer (A), the water content is preferably 5 to 25% by mass, more preferably 10 to 15% by mass. When the water content is in this range, an excellent thermal moldability tends to be obtained.

[Water-Soluble Polymer]

The material constituting the starch layer (A) may also comprise at least one water-soluble polymer. The content of the water-soluble polymer in the material constituting the starch layer (A) is preferably 2 to 50% by mass, more preferably 2 to 35% by mass. When the content of the water-soluble polymer is in this range, good strength at low temperatures tends to be obtained. Examples of the water-soluble polymer include a polyvinyl alcohol (A2), a polyethylene oxide, and a polyacrylamide, among which the polyvinyl alcohol (A2) is preferred from the standpoint of mechanical and physical properties. The polyvinyl alcohol (A2) has a saponification degree of preferably 80 to 99.8% by mole. When the saponification degree of the polyvinyl alcohol (A2) is in this range, sufficient strength and oxygen barrier properties are likely to be obtained. The saponification degree is more preferably 85% by mole or higher, still more preferably 88% by mole or higher. The term "saponification degree" used herein refers to a molar fraction of hydroxy groups with respect to a total amount of hydroxy groups and ester groups in the polyvinyl alcohol (A2). The saponification degree can be determined by, for example, quantifying the amount of residual acetic acid groups in a sample with sodium hydroxide.

The polyvinyl alcohol (A2) can further comprise a monomer unit other than a vinyl alcohol unit. This other monomer unit may be, for example, a monomer unit derived from an ethylenically unsaturated monomer. Examples of the ethylenically unsaturated monomer include: α-olefins, such as ethylene, propylene, n-butene, isobutylene, and 1-hexene; acrylic acid and salts thereof; unsaturated monomers having an acrylate group; methacrylic acid and salts thereof; unsaturated monomers having a methacrylate; acrylamide, N-methylacrylamide, N-ethylacrylamide, N,N-dimethylacrylamide, diacetone acrylamide, acrylamide propanesulfonic acid and salts thereof, acrylamide propyldimethylamine and salts thereof (e.g., a quaternary salt); methacrylamide, N-methylmethacrylamide, N-ethylmethacrylamide, methacrylamide propanesulfonic acid and salts thereof, methacrylamide propyldimethylamine and salts thereof (e.g., a quaternary salt); vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts and esters thereof; vinylsilyl compounds, such as vinyltrimethoxysilane; isopropenyl acetate; and vinyl ester monomers, such as vinyl formate, vinyl acetate, vinyl propionate, vinyl butyrate, vinyl isobutyrate, vinyl pivalate, vinyl versate, vinyl caproate, vinyl caprylate, vinyl laurate, vinyl palmitate, vinyl stearate, vinyl oleate, and vinyl benzoate. The content of the other monomer unit is preferably 10% by mole or less, more preferably 5% by mole or less. The monomer units in the polyvinyl alcohol can be measured by, for example, a $^{13}$C-NMR or IR method.

A method of producing the polyvinyl alcohol (A2) is not particularly limited. For example, a method of copolymerizing a vinyl alcohol monomer with other monomer and subsequently converting the resulting copolymer into a vinyl alcohol unit through saponification may be employed. Examples of a polymerization scheme used for the copolymerization include batch polymerization, semi-batch polymerization, continuous polymerization, and semi-continuous polymerization. Examples of a polymerization method include known methods, such as a bulk polymerization method, a solution polymerization method, a suspension polymerization method, and an emulsion polymerization method. For the saponification of the copolymer, any known method can be applied. For example, the saponification can be carried out in a state where the copolymer is dissolved in an alcohol or hydrous alcohol. The alcohol that can be used in this process is preferably a lower alcohol, such as methanol or ethanol.

The polyvinyl alcohol (A2) has a viscosity of preferably 1 mPa·s or higher, more preferably 2 mPa·s or higher, still more preferably 3 mPa·s or higher, but preferably 45 mPa·s or lower, more preferably 35 mPa·s or lower, as measured at 20° C. for a 4% aqueous solution in accordance with JIS Z8803. When the viscosity of the polyvinyl alcohol (A2) is the above-described lower limit value or higher but the above-described upper limit value or lower, sufficient strength and oxygen barrier properties are likely to be obtained.

[Clay]

The material constituting the starch layer (A) may also comprise at least one clay. The clay may be, for example, a synthetic or natural layered silicate clay, examples of which include montmorillonite, bentonite, beidellite, mica, hectorite, saponite, nontronite, sauconite, vermiculite, ledikite, magadite, kenyaite, stevensite, volkonskoite, and mixtures of these clays.

In some embodiments, the clay may be modified hydrophobically or hydrophilically.

In some embodiments, the layered silicate clay may be modified hydrophobically or hydrophilically.

A "hydrophobic clay" or "hydrophobically-modified layered silicate clay" is preferably a clay modified by exchange with a surfactant comprising a long-chain alkyl group. The long-chain alkyl group may comprise more than 4, more than 5, or more than 6 carbon atoms per chain. A preferred surfactant comprises a long-chain alkyl ammonium ion, such as a mono- or di-$C_{12}$-$C_{22}$ alkyl ammonium ion. Preferably, the long-chain alkyl group does not comprise any polar substituent, such as a hydroxyl group or a carboxyl group. Examples of a preferred hydrophobically-modified clay include: NANOMER I.40P manufactured by Nanocor, Inc.; and CLOISITE (registered trademark) 20A and CLOISITE (registered trademark) 25A, which are manufactured by Southern Clay Products, Inc.

The content of the clay in the material constituting the starch layer (A) is preferably 0.1 to 5% by mass, more preferably 0.1 to 3% by mass, still more preferably 0.5 to 2% by mass. When the content of the clay is in this range, the transparency, the flexibility, the tensile strength, the impact resistance, and/or the tensile characteristics tend to be improved.

[Other Additives]

The material constituting the starch layer (A) may further comprise a plasticizer, a humectant, a lubricant, and/or other additive(s).

Examples of the plasticizer include polyols, polyethylene glycols, epoxidized linseed oil, epoxidized soybean oil, tributyl citrate, 2,2,4-trimethyl-1,3-pentanediol diisobutyrate, and acetyl triethyl citrate. In the material constituting the starch layer (A), the content of the plasticizer is preferably 20% by mass or less.

Examples of the humectant include carrageenan, xanthan gum, gum arabic, guar gum, gelatin, and glycerol triacetate. The humectant can also serve as a water binder or a gelling agent. In the material constituting the starch layer (A), the content of the humectant is preferably 20% by mass or less.

Examples of the lubricant include fatty acids and fatty acid salts. The lubricant is particularly preferably one derived from a C12 to 22 fatty acid. Specific examples of such a lubricant include stearic acid, sodium stearate, and potassium stearate. In the material constituting the starch layer (A), the content of the lubricant is preferably 1.5% by mass or less.

<Adhesive Layer (B)>

The material constituting the adhesive layer (B) comprises a thermoplastic resin having a density of 0.920 $g/cm^3$ or lower. The material constituting the adhesive layer (B) may comprise one, or two or more thermoplastic resins. When the material constituting the adhesive layer (B) does not comprise a thermoplastic resin having a density of 0.920 $g/cm^3$ or lower, it is difficult to inhibit a reduction in the peel strength under a low-humidity condition. The density is preferably 0.9182 $g/cm^3$ or lower, more preferably 0.9100 $g/cm^3$ or lower, still more preferably 0.9000 $g/cm^3$ or lower, yet still more preferably 0.8900 $g/cm^3$ or lower, but preferably 0.5 $g/cm^3$ or higher, more preferably 0.85 $g/cm^3$ or higher. When the material constituting the adhesive layer (B) comprises a thermoplastic resin having a density of 0.920 g/cm³ or lower, a stress generated by dehydration shrinkage of the starch layer during low-temperature storage can be mitigated, so that a reduction in the peel strength under a low-humidity condition tends to be inhibited. When the material constituting the adhesive layer (B) comprises two or more thermoplastic resins, at least one of the thermoplastic resins may have a density of 0.920 g/cm³ or lower and, in such a case, the weighted average value, which takes into account the composition ratio of the two or more thermoplastic resins, is preferably 0.920 g/cm³ or lower. The above-described density can be measured by, for example, the method described below in the section of Examples.

The material constituting the adhesive layer (B) has an acid value of 0.3 mgKOH/g or higher. When the acid value is lower than 0.3 mgKOH/g, a sufficient adhesive strength between the starch layer (A) and the adhesive layer (B) may not be obtained, and the peel strength under low-humidity conditions is reduced. The acid value of the material constituting the adhesive layer (B) is preferably 0.4 mgKOH/g or higher, more preferably 0.5 mgKOH/g or higher, still more preferably 0.6 mgKOH/g or higher, yet still more preferably 1.5 mgKOH/g or higher, but preferably 5 mgKOH/g or lower, more preferably 3 mgKOH/g or lower. When the acid value of the material constituting the adhesive layer (B) is the above-described lower limit value or higher, a sufficient adhesive strength is attained between the starch layer (A) and the adhesive layer (B), while when the acid value is the above-described upper limit value or lower, reactions in thermal molding proceed moderately and, therefore, a molding defect is unlikely to occur. The above-described acid value can be measured by, for example, the method described below in the section of Examples. When the material constituting the adhesive layer (B) comprises two or more thermoplastic resins, the acid value of the material means an acid value measured for the material in the form of a mixture, as described below in the section of Examples.

The acid value correlates with the amount of an acid in the adhesive layer (B). It is believed that the acid in the adhesive layer (B) reacts with hydroxyl groups on the surface of the starch layer (A) to provide adhesion, contributing particularly to the initial adhesive strength and the peel strength under low-humidity conditions. As for the initial adhesive strength and the peel strength under low-humidity conditions, it is believed that two effects, which are an effect associated with the reaction between the acid in the adhesive layer (B) and the hydroxyl groups in the starch layer (A) and an effect attributed to the compatibility between the starch layer (A) and the adhesive layer (B), are involved. Therefore, in order to achieve good adhesion, it is believed that the material constituting the adhesive layer (B) of the multilayer structure of the present invention be required to have an acid value of 0.3 mgKOH/g or higher, more preferably 0.4 mgKOH/g or higher. The acid value of the material constituting the adhesive layer (B) can be adjusted to be the above-described lower limit value or higher by appropriately controlling, for example, the types and the constituting ratio of the structural units constituting the thermoplastic resin described below.

[Thermoplastic Resin]

The material constituting the adhesive layer (B) comprises a thermoplastic resin. Examples of the thermoplastic resin include polyolefin-based polymers, polyester-based polymers, and polyamide-based polymers, and the material constituting the adhesive layer (B) preferably comprises a polyolefin-based polymer, particularly a modified polyolefin-based polymer. Representative examples of the modified polyolefin-based polymer include: resins obtained by modifying a polyolefin having about 2 to 20 carbon atoms, such as ethylene, propylene, 1-butene, 3-methyl-1-butene, 1-pentene, 4-methyl-1-pentene, 1-hexene, 1-octene, or 1-decene; copolymers of a vinyl compound, such as vinyl acetate, vinyl chloride, acrylic acid, methacrylic acid, an acryllic acid ester, a methacrylic acid ester or a polystyrene, and an olefin; and resins obtained by modifying a polyolefin-based copolymer, such as an ethylene-propylene copolymer, an ethylene-propylene-diene copolymer, an ethylene-1-butene copolymer, or a propylene-1-butene copolymer. Examples of a modification method include modification under graft reaction conditions. Examples of a material used for a graft reaction include: unsaturated carboxylic acids, such as acrylic acid, methacrylic acid, crotonic acid, isocrotonic acid, maleic acid, fumaric acid, itaconic acid, citraconic acid, and tetrahydrophthalic acid; and derivatives of these acids, such as halides, amides, imides, anhydrides, and esters. Specific examples of the derivatives include malenyl chloride, maleimide, maleic anhydride, citraconic anhydride, monomethyl maleate, dimethyl maleate, and glycidyl maleate. The use of any of these modified polyolefin-based polymers is likely to inhibit yellowing of the multilayer structure during the use.

Meanwhile, from the standpoint of inhibiting yellowing of the multilayer structure during the use, the content of a urethane-based resin in the material constituting the adhesive layer (B) is preferably 50% by mass or less, more preferably 10% by mass or less, most preferably 0% by mass.

Among the above-described modified polyolefin-based polymers, a resin modified with an unsaturated dicarboxylic acid or an anhydride thereof, particularly maleic acid or an anhydride thereof, is preferred from the standpoints of the reactivity and the hygiene as a food packaging material. The resin to be modified is preferably an ethylene-based resin, a propylene-based resin, an ethylene-propylene copolymer, or an ethylene-1-butene copolymer. Accordingly, in a preferred embodiment of the present invention, it is preferred to use a polyolefin-based polymer modified with maleic anhydride, namely a polyolefin-based polymer having a maleic anhydride-derived structural unit.

<Base Material Layer (C)>

The base material layer (C) is a layer having a tensile elastic modulus of 100 MPa or higher. The tensile elastic modulus is 100 MPa or higher, preferably 200 MPa or higher, more preferably 300 MPa or higher, still more preferably 500 MPa or higher, yet still more preferably 1,000 MPa or higher, particularly preferably 2,000 MPa or higher, especially preferably 3,000 MPa or higher. The elastic modulus can be measured by, for example, the method described below in the section of Examples. The elastic modulus is usually 8,000 MPa or lower. In order to control the tensile elastic modulus of the base material layer (C) to be the above-described lower limit value or higher, for example, the types and the constituting ratio of the materials constituting the base material layer (C) can be adjusted. When the elastic modulus is lower than 100 MPa, the base material layer does not have a sufficient strength and is thus likely to be broken. The material constituting the base material layer (C) preferably comprises at least one selected from the group consisting of polyethylene terephthalates (PET), polylactic acids (PLA), polyethylenes, polypropylenes, cellophanes, aromatic polyesters, and polybutylene succinates (PBS). The content of the above-described material in the base material layer (C) is preferably 10 to 100% by mass, more preferably 20 to 90% by mass. The material constituting the base material layer (C) may further comprise other material, such as a polyolefin, a nylon, a polyvinyl chloride, or a polyvinylidene dichloride. When the base material layer (C) comprises other material, the content thereof in the base material layer (C) may be preferably 5 to 50% by mass (provided that a total amount of all materials in the base material layer (C) is 100% by mass).

A resin material contained in the base material layer (C) may be a biodegradable resin. Examples of the biodegradable resin include polybutylene adipate-butylene terephthalate copolymers (PBAT), polyhydroxybutyrates, polycaprolactones, polyhydroxyalkanoates, polyglycolic acids, modified polyvinyl alcohols, starches, and celluloses. The material constituting the base material layer (C) may comprise one, or two or more biodegradable resins and, when two or more biodegradable resins are comprised, the blending ratio thereof is not particularly limited.

<Multilayer Structure>

The multilayer structure of the present invention has a thickness of preferably 30 to 1,000 μm. The thickness of the starch layer (A) is preferably 20 to 500 μm, and the thickness of the base material layer (C) is preferably 10 to 500 μm. When the thickness of the starch layer (A) is in the above-described range, the starch layer (A) tends to have good gas barrier properties. Further, when the thickness of the base material layer (C) is in the above-described range, breakage of the base material is unlikely to occur.

The thickness of the adhesive layer (B) is preferably 5 to 50 μm, more preferably 10 to 30 μm. When this thickness is 5 μm or greater, a sufficient interlayer adhesive strength is likely to be obtained, while when the thickness is 50 μm or less, a defect in outer appearance, which is called "whisker burr", is unlikely to be generated during a punching process of a container that is performed after thermal molding.

The layer configuration of the multilayer structure is not particularly limited as long as it includes three layers, which are the starch layer (A), the adhesive layer (B) and the base material layer (C), in the order mentioned. When the starch layer (A), the adhesive layer (B) and the base material layer (C) are denoted as "A", "B" and "C", respectively, examples of the layer configuration include three-layer configuration of A/B/C, and five-layer configurations, such as A/B/C/B/A, A/B/A/B/C, and C/B/A/B/C. The multilayer structure may further comprise a layer (D) other than the starch layer (A), the adhesive layer (B) and the base material layer (C). When the layer (D) is denoted as "D", examples of the layer configuration include D/A/B/C, D/B/A/B/C, A/D/B/C, A/B/D/B/C, A/B/D/C, A/B/D/B/C, A/B/C/D, A/B/C/B/D, D/A/B/C/D, and D/B/A/B/C/B/D. Among the above-described layer configurations, D/A/B/C, A/B/C/D, and D/A/B/C/D, in which A and B are adjacent to each other and B and C are adjacent to each other, are preferred. The layer (D) is not particularly limited, and examples thereof include a piece of paper. The piece of paper is not particularly limited, and may be a piece of, for example, glassine paper, craft paper, high-quality paper, medium-quality paper, embossed paper, coated paper, carbon-free paper, or paperboard.

After the multilayer structure of the present invention is left to stand at a temperature of 23° C. and a humidity of 50% RH for one week, the peel strength (P1) between the starch layer (A) and the adhesive layer (B) is preferably 1.0 kgf/15 mm or higher. In addition, after the multilayer structure of the present invention is left to stand at a temperature of 40° C. and a humidity of 15% RH for 48 hours, the peel strength (P2) between the starch layer (A) and the adhesive layer (B) is preferably 0.5 kgf/15 mm or higher. Further, the peel strength reduction rate, which is represented by the following formula, is usually lower than 60%, preferably lower than 50%, more preferably lower than 30%. The above-described peel strengths can be measured by, for example, the method described below in the section of Examples.

Peel strength reduction rate=100×[Peel strength (P1)−Peel strength (P2)]/Peel strength (P1)

<Method of Producing Multilayer Structure>

A method of producing the multilayer structure of the present invention is not particularly limited. Examples thereof include a method which includes the steps of: co-extruding the adhesive layer (B) and the base material layer (C); and subsequently coating the side of the adhesive layer (B) onto the starch layer (A), and a method which includes the steps of: extruding the adhesive layer (B); and subsequently coating the adhesive layer (B) between the starch layer (A) and the base material layer (C).

In the step of co-extruding the adhesive layer (B) and the base material layer (C), for example, a two-component bilayer co-extrusion cast film formation equipment (an extruder manufactured by Research Laboratory of Plastics Technology Co., Ltd.) (extruder (1) for base material layer (C): single screw, screw diameter=40 mm, L/D=32; extruder (2) for adhesive layer (B): single screw, screw diameter=32 mm, L/D=26) can be used. The temperature conditions of the extruder may be set as appropriate in accordance with the thermoplastic resin to be used and, for example, in the case of extruding a PET (polyethylene terephthalate) using the extruder (1) for the base material layer (C), the cylinder temperature, the adaptor temperature and the dies temperature can be set at 250 to 270° C., 270° C., and 275° C., respectively.

Further, for example, in the case of extruding a polyolefin using the extruder (2) for the adhesive layer (B), the cylinder temperature, the adaptor temperature and the dies temperature can be set at 175 to 270° C., 270° C., and 275° C., respectively. The absolute value of the difference between the dies temperature of the extruder (1) and that of the extruder (2) is preferably 10° C. or less, more preferably 0° C. For example, when the resin used in the extruder (1) and the resin used in the extruder (2) have different optimum dies temperatures, it is preferred to adjust the dies temperature by adopting a higher optimum dies temperature.

In the subsequent step of coating the side of the adhesive layer (B) onto the starch layer (A), for example, a method of coating the thus co-extruded laminate onto the starch layer (A) while drawing the adhesive layer (B) side of the laminate, and subsequently pasting them together using a nip roll, may be employed. The drawing speed is preferably 1 to 10 m/min.

<Packaging Container>

The packaging container of the present invention comprises the multilayer structure of the present invention. The packaging container may consist of the multilayer structure of the present invention, or may include other material in combination. The packaging container can be obtained by, for example, thermally molding the multilayer structure of the present invention. A thermal molding method is not particularly restricted, and examples thereof include general vacuum molding and compression molding as well as applications thereof, such as a plug-assist method in which a plug is brought into contact with one side of the multilayer structure to perform molding, and a method so-called multi-molding, in which a pair of male and female molds are brought into contact with the respective sides of the multilayer structure to perform molding. Further, examples of a method of heat-softening the multilayer structure prior to the molding include non-contact heating and direct heating, and the non-contact heating may be, for example, radiation heating using an infrared heater or the like. For the direct heating, any known heating method, such as hot-plate heating in which the multilayer structure is brought into direct contact with a hot plate, can be applied.

The packaging container composed of the multilayer structure of the present invention is excellent as a packaging container since it maintains a peel strength even when stored under a low-humidity condition. In a more preferred embodiment, the packaging container has excellent oxygen barrier properties and biodegradability and, therefore, can be particularly preferably used as a food packaging container.

EXAMPLES

The present invention will be described more concretely by way of Examples and the like; however, the present invention is not limited thereto by any means.

<Tensile Elastic Modulus of Base Material Layer (C)>

Each resin material used as the base material layer (C) was extruded using a single screw extruder (extruder manufactured by Research Laboratory of Plastics Technology Co., Ltd., diameter 40 mm, L/D=25) under the respective conditions shown in Table 1 below.

TABLE 1

| | | Extruder conditions (° C.) | | |
|---|---|---|---|---|
| | Type | Cylinder temperature | Adaptor temperature | Dies temperature |
| PET | TRAYTUF 7300 | 250 to 270 | 270 | 275 |
| PBS | FZ91 | 180 to 200 | 200 | 200 |
| PLA | ECOLOJU SA104 | 180 to 200 | 200 | 200 |
| PHA | PHBH 151N | 130 to 160 | 160 | 160 |
| PBAT | ECOVIO FT2341 | 160 to 200 | 200 | 200 |
| LDPE | NOVATEC LD LJ400 | 160 to 200 | 200 | 200 |

PHA: 3-hydroxybutyrate-3-hydroxyhexanoate copolymer

The extruded resin was discharged onto a casting roll to prepare a 30 μm-thick monolayer film of the base material layer (C). As a cellophane, a commercially available Nature Flex NK19 film (thickness: 20 μm) was used.

The obtained film was stored in a control room of 23° C. and 50% RH for one week and thereby humidity-controlled, and subsequently cut out into a size of 15 mm in width and 150 mm in length to obtain a test piece. For this test piece, the tensile elastic modulus was measured using a tensile testing machine (INSTRON 3367, manufactured by Instron Corporation) at a rate of 20 min/min and a chuck distance of 50 mm. The same test was conducted for a total of five times, and an average value thereof was determined as the value of the tensile elastic modulus.

<Peel Strength (Normal Humidity) of Multilayer Structures>

The multilayer structures produced in Examples and Comparative Examples were stored in a control room of 23° C. and 50% RH for one week and thereby humidity-controlled, and subsequently cut out into a size of 15 mm×150 mm to obtain test pieces.

For the starch layer (A) and the adhesive layer (B) of each multilayer structure, interlayer peeling was performed using a tensile testing machine (INSTRON 3367, manufactured by Instron Corporation) at a rate of 50 mm/min, a chuck distance of 50 mm and a peeling angle of 180° to measure the peel strength. The same test was conducted for a total of five times, and an average value thereof was determined as the value of the peel strength.

<Peel Strength (Low Humidity) of Multilayer Structures>

The multilayer structures produced in Examples and Comparative Examples were stored in a control room of 23° C. and 50% RH for one week and thereby humidity-controlled. These multilayer structures were further stored in a control room of 40° C. and 15% RH for 48 hours and thereby humidity-controlled, and subsequently cut out into a size of 15 mm×150 mm to obtain test pieces.

The value of the peel strength was determined in the same manner as in the above-described <Peel Strength (Normal Humidity) of Multilayer Structures>, except that the test pieces were changed.

It is noted that the value of the peel strength required for a packaging material under low-humidity and normal-humidity conditions varies depending on the product shape. For example, the peel strength is, as a standard, preferably 1.5 kgf/15 mm or higher for a tray-shaped packaging material obtained by thermal molding or the like of the multilayer structure of the present invention, or preferably 0.5 kgf/15 mm or higher for a flexible packaging material composed of the multilayer structure of the present invention. The standard value varies depending on the application; however, a peel strength of less than 0.4 kgf/15 mm cannot satisfy the performance required for most product shapes and applications.

<Density of Thermoplastic Resin Constituting Adhesive Layer (B)>

Using AccuPyc 111340 manufactured by Shimadzu Corporation, the density was measured for pellets of each thermoplastic resin by a dry measurement method using a gas (helium gas) at an apparatus temperature of 25° C. (±1° C.). The same test was conducted for a total of three times, and an average value thereof was determined as the value of the density.

<Acid Value of Material Constituting Adhesive Layer (B)>

In an Erlenmeyer flask, 400 mg of each thermoplastic resin constituting the adhesive layer (B) was weighed, and 80 ml of xylene was added thereto. These materials were stirred with heating at 130° C. to dissolve the thermoplastic resin. A trace amount of phenolphthalein was added to the resulting solution, and this solution was titrated with a 0.05 mol/L potassium hydroxide-ethanol solution to determine the acid value.

<UV Fade Meter Test of Multilayer Structures (Yellowing)>

The multilayer structures produced in Examples and Comparative Examples were stored in a control room of 23° C. and 50% RH for one week and thereby humidity-controlled, and subsequently cut out into a size of 50 mm×100 mm to obtain test pieces.

Using a UV fade meter (U48H, manufactured by Suga Test Instruments Co., Ltd.), the starch layer (A) side of each test piece was irradiated with UV at an irradiation intensity of 0.70 W/m$^2$ and a black panel temperature of 63±3° C. for an irradiation time of 100 hours to perform measurement, and yellowing was visually evaluated.

<Preparation of Starch Layer (A)>

A material of the starch layer (A) was prepared by the following method. A modified starch (i) [ECOFILM (registered trademark), manufactured by Ingredion Inc.; a propyl oxide-modified corn starch, amylose content: 70% by mass] and a water-soluble resin (ii) [a polyvinyl alcohol solution, viscosity: 30 mPa·s, saponification degree: 99%] were mixed in a tumbler mixer for 2 hours such that the content of the modified starch (i) and that of the water-soluble resin (ii) would be 40% by mass to 70% by mass and 5% by mass to 35% by mass, respectively, in the resulting material constituting the starch layer (A). A powder obtained by this mixing was supplied to a hopper of an extruder via a weight feeder at a rate of 3.5 kg/hour. Water was passed through a liquid delivery pump such that the amount of water would be 25% by mass with respect to a total mass of the powder and water, and was injected into a barrel of the extruder to prepare the material of the starch layer (A) in the barrel.

The thus obtained material was extruded through a die of the extruder and cooled, and the starch layer (A) was obtained with the drawing speed being set such that the starch layer (A) had a thickness of 150 μm after being dried. The cylinder temperature during the production of the starch layer (A) was set in accordance with the temperature profile shown in Table 2 below. The C5 to C9 represent cooking zones.

TABLE 2

| Temperature Profile (° C.) | | | | | | | | | | | | |
|---|---|---|---|---|---|---|---|---|---|---|---|---|
| C1 | C2 | C3 | C4 | C5 | C6 | C7 | C8 | C9 | C10 | C11 | Adaptor | Die |
| 40 | 70 | 80 | 90 | 115 | 125 | 135 | 135 | 135 | 135 | 115 | 100 | 90 |

Example 1

A PET (polyethylene terephthalate) (TRAYTUF 7300, manufactured by M&G Chemicals SA) was used as a material of the base material layer (C). A polyolefin (ADMER SE800, manufactured by Mitsui Chemicals, Inc.) was used as a material of the adhesive layer (B).

Co-extrusion was performed by extruding the material of the base material layer (C) at a cylinder temperature of 250° C. to 270° C., an adaptor temperature of 270° C., and a die temperature of 275° C., while extruding the material of the adhesive layer (B) at a cylinder temperature of 175° C. to 270° C., an adaptor temperature of 270° C., and a dies temperature of 275° C., whereby a laminated film consisting of the adhesive layer (B) and the base material layer (C) [20 μm-thick adhesive layer (B)/150 μm-thick base material layer (C)] was obtained.

The adhesive layer (B) side of this laminated film was coated onto the 150 μm-thickness starch layer (A) film obtained in the above-described <Preparation of Starch Layer (A)>, and these films were pasted together using a nip roll to produce a multilayer structure [150 μm-thick starch layer (A)/20 μm-thick adhesive layer (B)/150 μm-thick base material layer (C)] at a drawing speed of 3 m/min.

Example 2

A multilayer structure was produced in the same manner as in Example 1, except that the material of the adhesive layer (B) was changed to a polyolefin (ADMER SE810, manufactured by Mitsui Chemicals, Inc.).

Example 3

A multilayer structure was produced in the same manner as in Example 1, except that the material of the adhesive layer (B) was changed to a polyolefin (ADMER SF741, manufactured by Mitsui Chemicals, Inc.).

Example 4

A multilayer structure was produced in the same manner as in Example 1, except that the material of the adhesive layer (B) was changed to a polyolefin (ADMER SF725, manufactured by Mitsui Chemicals, Inc.).

Example 5

A multilayer structure was produced in the same manner as in Example 4, except that the material of the base material layer (C) was changed to a PBS (polybutylene succinate) (PBS FZ91, manufactured by Mitsubishi Chemical Corporation) and extruded at a cylinder temperature of 180° C. to 200° C., an adaptor temperature of 200° C., and a dies temperature of 200° C.

Example 6

A multilayer structure was produced in the same manner as in Example 4, except that the material of the base material layer (C) was changed to a PLA (polylactic acid) (ECOLOJU SA104, manufactured by Mitsubishi Chemical Corporation) and its extrusion conditions were modified (extruder cylinder temperature: 180° C. to 200° C., adaptor temperature: 200° C., dies temperature: 200° C.), and that the extrusion conditions of the polyolefin (ADMER SF725, manufactured by Mitsui Chemicals, Inc.) used as the material of the adhesive layer (B) were also modified (extruder cylinder temperature: 175 to 200° C., adaptor temperature: 200° C., dies temperature: 200° C.).

Example 7

As the material of the adhesive layer (B), a polyolefin (ADMER SF725, manufactured by Mitsui Chemicals, Inc.) was extruded in a single layer (extruder cylinder temperature: 160° C. to 200° C., adaptor temperature: 200° C., dies temperature: 200° C.), and the resulting adhesive layer (B) was coated onto the starch layer (A). Subsequently, as the base material layer (C), a 20 μm-thick cellophane (NATURE FLEX NK19, manufactured by Futamura Chemical Co., Ltd.) was sand-laminated on the surface of the adhesive layer (B), whereby a multilayer structure was produced.

Example 8

A multilayer structure was produced in the same manner as in Example 4, except that the material of the base material layer (C) was changed to a PHA (3-hydroxybutyrate-3-hydroxyhexanoate copolymer) (PHBH 151N, manufactured by Kaneka Corporation) and its extrusion conditions were modified (extruder cylinder temperature: 130° C. to 160° C., adaptor temperature: 160° C., dies temperature: 160° C.), and that the extrusion conditions of the polyolefin (ADMER SF725, manufactured by Mitsui Chemicals, Inc.) used as the material of the adhesive layer (B) were also modified (extruder cylinder temperature: 150 to 160° C., adaptor temperature: 160° C., dies temperature: 160° C.).

Example 9

A multilayer structure was produced in the same manner as in Example 4, except that the material of the base material layer (C) was changed to a PBAT (polybutylene adipate-butylene terephthalate copolymer) (ECOVIO FT2341, manufactured by BASF Ltd.) and its extrusion conditions were modified (extruder cylinder temperature: 160° C. to 200° C., adaptor temperature: 200° C., dies temperature: 200° C.), and that the extrusion conditions of the polyolefin (ADMER SF725, manufactured by Mitsui Chemicals, Inc.) used as the material of the adhesive layer (B) were also modified (extruder cylinder temperature: 160 to 200° C., adaptor temperature: 200° C., dies temperature: 200° C.).

Example 10

A multilayer structure was produced in the same manner as in Example 4, except that the material of the base material layer (C) was changed to an LDPE (polyolefin) (NOVATEC LD LJ400, manufactured by Japan Polyethylene Corporation) and its extrusion conditions were modified (extruder cylinder temperature: 160° C. to 200° C., adaptor temperature: 200° C., die temperature: 220° C.), and that the extrusion conditions of the polyolefin (ADMER SF725, manufactured by Mitsui Chemicals, Inc.) used as the material of the adhesive layer (B) were also modified (extruder cylinder temperature: 160 to 220° C., adaptor temperature: 220° C., die temperature: 220° C.), and in this Example 10, the die temperature was set according to the material that required a higher temperature (the adhesive layer (B) in this case).

Example 11

A multilayer structure was produced in the same manner as in Example 4, except that a polyolefin (ADMER SF725, manufactured by Mitsui Chemicals, Inc.) and another polyolefin (ADMER NF567, manufactured by Mitsui Chemicals, Inc.) were dry-blended at a mass ratio of 75:25 and used as the material of the adhesive layer (B).

Example 12

A multilayer structure was produced in the same manner as in Example 4, except that a polyolefin (ADMER SE800, manufactured by Mitsui Chemicals, Inc.) and an LDPE (polyolefin) (NOVATEC LD LC600A, manufactured by Japan Polyethylene Corporation) were dry-blended at a mass ratio of 75:25 and used as the material of the adhesive layer (B).

Comparative Example 1

A multilayer structure was produced in the same manner as in Example 1, except that the material of the adhesive layer (B) was changed to a polyolefin (LOTADER 4503, manufactured by Arkema K.K.).

Comparative Example 2

A multilayer structure was produced in the same manner as in Example 1, except that the material of the adhesive layer (B) was changed to a polyolefin (AMPLIFY TY4351, manufactured by The Dow Chemical Company).

Comparative Example 3

A multilayer structure was produced in the same manner as in Example 1, except that the material of the adhesive layer (B) was changed to a polyolefin (BYNEL 21E830, manufactured by DuPont de Nemours, Inc.).

Comparative Example 4

A polyethylene terephthalate (TRAYTUF 7300, manufactured by M&G Chemicals SA) was used as a material of the base material layer (C). A polyurethane-based adhesive (MOR Free PU adhesive, manufactured by Rohm and Haas Company) was used as a material of the adhesive layer (B).

The material of the base material layer (C) was extruded at a cylinder temperature of 250° C. to 270° C., an adaptor temperature of 270° C. and a die temperature of 275° C. to prepare a 150 µm-thick sheet. The material of the adhesive layer (B) was coated on the base material layer (C) by dry lamination at a thickness of 15 µm. The adhesive layer (B) side of the obtained laminated film consisting of the adhesive layer (B) and the base material layer (C) was pasted to the 150 µm-thick starch layer (A) film obtained in the above-described <Preparation of Starch Layer (A)> using a nip roll, whereby a multilayer structure [150 µm-thick starch layer (A)/15 µm-thick adhesive layer (B)/150 µm-thick base material layer (C)] was produced.

Comparative Example 5

A multilayer structure was produced in the same manner as in Example 4, except that a polyolefin (ADMER SE800, manufactured by Mitsui Chemicals, Inc.) and an LDPE (polyolefin) (NOVATEC LD LC600A, manufactured by Japan Polyethylene Corporation) were dry-blended at a mass ratio of 50:50 and used as the material of the adhesive layer (B).

Various evaluations were performed on the multilayer structures produced in Examples 1 to 12 and Comparative Examples 1 to 5. The results thereof are shown in Table 3. It is noted that, when the adhesive layer (B) comprises two kinds of thermoplastic resins, the density thereof is indicated in terms of weighted average value that takes into account the composition ratio of the thermoplastic resins.

TABLE 3

| | Adhesive layer (B) | | | Base material layer (C) | | Peel strength (kgf/15 mm) | | Reduction rate (%) | Evaluation of molded product Yellowing |
| | | | | | Tensile elastic modulus (MPa) | 23° C., 50% RH (1 week) | 40° C., 15% RH (48 hours) | | |
| | Raw material | Density (g/cm³) | Acid value (mgKOH/g) | Raw material | | | | | |
|---|---|---|---|---|---|---|---|---|---|
| Example 1 | ADMER SE800 | 0.900 | 0.54 | PET | TRAYTUF 7300 | 2,055 | 1.1 | 0.9 | 18.2 | none |
| Example 2 | ADMER SE810 | 0.890 | 0.64 | PET | TRAYTUF 7300 | 2,055 | 3.2 | 2.2 | 31.3 | none |
| Example 3 | ADMER SF741 | 0.900 | 1.57 | PET | TRAYTUF 7300 | 2,055 | 2.5 | 1.4 | 44.0 | none |
| Example 4 | ADMER SF725 | 0.918 | 1.30 | PET | TRAYTUF 7300 | 2,055 | 2.1 | 2.0 | 4.8 | none |

TABLE 3-continued

| | Adhesive layer (B) | | | Base material layer (C) | | Peel strength (kgf/15 mm) | | Reduction rate (%) | Evaluation of molded product Yellowing |
|---|---|---|---|---|---|---|---|---|---|
| | Raw material | Density (g/cm³) | Acid value (mgKOH/g) | | Raw material | Tensile elastic modulus (MPa) | 23° C., 50% RH (1 week) | 40° C., 15% RH (48 hours) | |
| Example 5 | ADMER SF725 | 0.918 | 1.30 | PBS | PBS FZ91 | 638 | 2.3 | 2.0 | 13.0 | none |
| Example 6 | ADMER SF725 | 0.918 | 1.30 | PLA | ECOLOJU SA104 | 3,423 | 2.0 | 1.5 | 25.0 | none |
| Example 7 | ADMER SF725 | 0.918 | 1.30 | cellophane | NATURE FLEX NK19 (thickness-20 µm) | 5,310 | 2.5 | 1.8 | 28.0 | none |
| Example 8 | ADMER SF725 | 0.918 | 1.30 | PHA | PHBH 151N | 997 | 2.2 | 1.7 | 22.7 | none |
| Example 9 | ADMER SF725 | 0.918 | 1.30 | PBAT | ECOVIO FT2341 | 270 | 1.5 | 1.3 | 13.3 | none |
| Example 10 | ADMER SF725 | 0.918 | 1.30 | LDPE | NOVATEC LD LJ400 | 179 | 1.0 | 0.95 | 2.1 | none |
| Example 11 | ADMER SF725/ADMER NF567 = 75/25 | 0.918 | 1.45 | PET | TRAYTUF 7300 | 2,055 | 2.2 | 2.1 | 4.5 | none |
| Example 12 | ADMER SE800/NOVATEC LD LC600A = 75/25 | 0.905 | 0.41 | PET | TRAYTUF 7300 | 2,055 | 1.0 | 0.8 | 20.0 | none |
| Comparative Example 1 | LOTADER 4503 | 0.940 | 2.83 | PET | TRAYTUF 7300 | 2,055 | 0.5 | 0.02 | 96.0 | none |
| Comparative Example 2 | AMPLIFY TY4351 | 0.922 | 2.34 | PET | TRAYTUF 7300 | 2,055 | 1.8 | 0.01 | 99.4 | none |
| Comparative Example 3 | BYNEL 21E830 | 0.946 | 1.00 | PET | TRAYTUF 7300 | 2,055 | 0.2 | 0.02 | 90.0 | none |
| Comparative Example 4 | MOR Free PU | 1.210 | (not measured) | PET | TRAYTUF 7300 | 2,055 | 3.0 | 2.8 | 6.7 | yes |
| Comparative Example 5 | ADMER SE800/NOVATEC LD LC600A = 50/50 | 0.909 | 0.27 | PET | TRAYTUF 7300 | 2,055 | 0.2 | 0.1 | 50.0 | none |

As shown in Table 3, as a result of leaving the multilayer structures in a control room of 40° C. and 15% RH for 48 hours, it was confirmed that, in those cases where the material constituting the adhesive layer (B) comprised a thermoplastic resin having a density of 0.920 g/cm³ or lower and had an acid value of 0.3 mgKOH/g or higher as in Examples 1 to 12, the multilayer structures had a low peel strength reduction rate and maintained a peel strength even when stored under a low-humidity condition. In addition, these multilayer structures did not show yellowing and had a good outer appearance.

The invention claimed is:

1. A multilayer structure comprising, in the following order:
    a starch layer (A), comprising a starch and water;
    an adhesive layer (B), comprising a thermoplastic resin having a density of 9.20 g/cm3 or lower and an acid value of 0.3 mgKOH/g or higher; and
    a base material layer (C), having a tensile elastic modulus of 100 MPa or higher,
    wherein
    the adhesive layer is disposed on the base material layer and the starch layer is disposed on the adhesive layer.

2. The multilayer structure of claim 1, wherein starch layer (A) comprises 20% by mass or more of starch, based on a total mass of the starch layer, and the starch has an amylose content of 50% by mass or more, based on a total mass of starch.

3. The multilayer structure of claim 1, wherein the starch layer (A) comprises a water-soluble polymer.

4. The multilayer structure of claim 1, wherein the starch layer (A) comprises at least one clay.

5. The multilayer structure of claim 1, wherein the adhesive layer (B) comprises a polyolefin-based polymer.

6. The multilayer structure of claim 1, wherein the base material layer (C) comprises at least one selected from the group consisting of a polyethylene terephthalate, a polylactic acid, a polyethylene, a polypropylene, a cellophane, an aromatic polyester, and a polybutylene succinate.

7. A method of producing the multilayer structure of claim 1, the method comprising:
    co-extruding an adhesive layer (B) and a base material layer (C); and
    coating a side of the adhesive layer (B) with a starch layer (A).

8. A method of producing the multilayer structure of claim 1, the method comprising:
    extruding an adhesive layer (B); and
    coating the adhesive layer (B) between a starch layer (A) and a base material layer (C).

9. A packaging container, comprising the multilayer structure of claim 1.

* * * * *